(12) United States Patent
Kurup

(10) Patent No.: US 11,281,736 B1
(45) Date of Patent: Mar. 22, 2022

(54) SEARCH QUERY MAPPING DISAMBIGUATION BASED ON USER BEHAVIOR

(71) Applicant: Amazon Technologies, Inc., Seattle, WA (US)

(72) Inventor: Madhu M. Kurup, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 16/712,765

(22) Filed: Dec. 12, 2019

(51) Int. Cl.
  *G06F 16/9535* (2019.01)
  *G06Q 30/06* (2012.01)
  *G06F 16/9538* (2019.01)

(52) U.S. Cl.
  CPC ...... *G06F 16/9535* (2019.01); *G06F 16/9538* (2019.01); *G06Q 30/0633* (2013.01)

(58) Field of Classification Search
  CPC ............ G06F 16/9535; G06F 16/9538; G06Q 30/0633
  See application file for complete search history.

(56) References Cited

U.S. PATENT DOCUMENTS

| | | | |
|---|---|---|---|
| 9,251,271 B2* | 2/2016 | Sidhu | G06F 16/9535 |
| 10,380,210 B1* | 8/2019 | Lai | G06F 16/9535 |
| 2013/0282682 A1* | 10/2013 | Batraski | G06F 16/951 |
| | | | 707/706 |
| 2015/0052115 A1* | 2/2015 | Sharifi | G06F 16/24578 |
| | | | 707/722 |
| 2017/0031931 A1* | 2/2017 | Linda | G06F 16/909 |
| 2018/0285457 A1* | 10/2018 | Pulbere | G06F 16/334 |
| 2020/0142890 A1* | 5/2020 | Zhang | G06F 16/24578 |

\* cited by examiner

*Primary Examiner* — Kris E Mackes
(74) *Attorney, Agent, or Firm* — Knobbe, Martens, Olson & Bear, LLP

(57) ABSTRACT

Systems and methods are provided for generating query mapping information that associates each of a number of search queries to a corresponding preferred query form to be used in generating search results. A number of queries previously submitted by users may be normalized, then grouped together with other queries sharing the same normalized form. A preferred query form for each group may then be selected. One or more inaccurate mappings may be identified in the initial mapping results based on an analysis of the user behavior of users who previously submitted the search queries included in a given query mapping. A final set of mapped queries may then be generated for use in responding to subsequent search requests, where the final set includes a number of mappings that each associate a particular user-submitted query with a corresponding preferred query form.

20 Claims, 6 Drawing Sheets

| Query | Frequency |
|---|---|
| a cowboy tale | 11 |
| a cowboy's tale | 89 |
| a cowboy?s tale | 19 |
| a cowboys tale | 167 |
| cowboy | 4258 |
| cowboyboots | 56 |
| cowboyhat | 80 |
| cowboyhats | 39 |
| cowboys | 5040 |
| cowboys tale | 17 |
| dallas cowboys | 93 |
| dallascowboys | 41 |
| ... | |

↳ Query data 502

| Query | Standardized Form | Frequency |
|---|---|---|
| a cowboy tale | a cow boy tale | 11 |
| a cowboys tale | a cow boy tale | 167 |
| a cowboy?s tale | a cow boy tale | 19 |
| a cowboy's tale | a cow boy tale | 89 |
| cowboyboots | cow boy boot | 56 |
| cowboyhats | cow boy hat | 39 |
| cowboyhat | cow boy hat | 80 |
| cowboys tale | cow boy tale | 17 |
| cowboy | cow boy | 4258 |
| cowboys | cow boy | 5040 |
| dallas cowboys | dallas cow boy | 93 |
| dallascowboys | dallas cow boy | 41 |
| ... | | |

↳ Standardized mappings 504

Intermediate set 506

| Query | Preferred Query |
|---|---|
| a cowboy tale | a cowboys tale |
| a cowboy's tale | a cowboys tale |
| a cowboy?s tale | a cowboys tale |
| cowboyhats | cowboyhat |
| cowboy | cowboys |
| dallascowboys | dallas cowboys |
| ... | |

Final set 508

| Query | Preferred Query |
|---|---|
| a cowboy tale | a cowboys tale |
| a cowboy's tale | a cowboys tale |
| a cowboy?s tale | a cowboys tale |
| cowboyhats | cowboyhat |
| dallascowboys | dallas cowboys |
| ... | |

SEARCH QUERY MAPPING DISAMBIGUATION BASED ON USER BEHAVIOR

BACKGROUND

Retailers and merchants involved in electronic commerce often provide user interfaces from which a user may search or browse an electronic catalog for products or other items available for purchase. For example, a user may be presented with a user interface that enables the user to enter text of a search query that describes an item of interest to the user. The search techniques implemented by a server or other computing system to process the search query and provide results varies depending on the particular system. For example, in some systems, the search results may be items that include the user-submitted search query text within an item description, item title, or other item information stored in association with the given item. In other systems, the search results may be based in part on an analysis of user behavior of users who previously submitted the same search query (such as by displaying search results that include items frequently viewed and/or purchased by one or more users after those users previously submitted the given search query). In either case, a user will often be presented with search results that do not include items that are actually of interest to the user or that match the user's intent in submitting the search query. Depending on the given search techniques used by a given system, this may occur for reasons that include the user submitting a search query that is not included in many items' descriptions in a given catalog or repository, or a user submitting a search query that has never or infrequently been entered by previous users.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
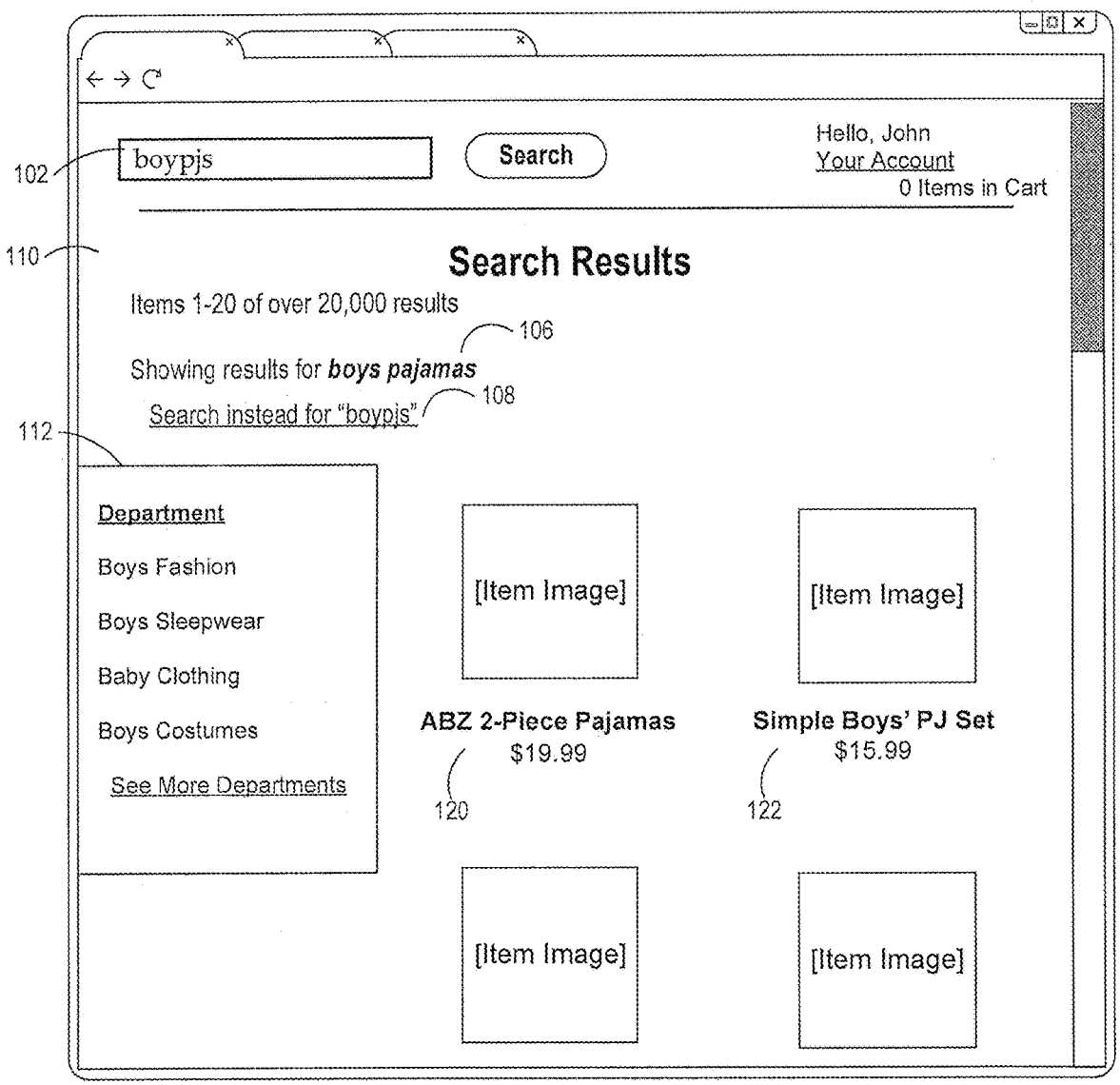
FIG. 1 is an illustrative user interface that presents item search results responsive to a user-submitted search request, where the resulting items were determined to be associated with a revised query that was previously mapped to the user's submitted search query.

Generally described, aspects of the present disclosure relate to improved systems and methods for generating mappings or associations between search queries that represent the same concept or user intent as one another. These mappings may then be used in generating search results for responding to user-submitted search queries in a manner that better matches a user's search intent, such as by leveraging the system's analysis of prior user behavior across a number of related queries that may not have been associated with each other by the system using alternative or existing search approaches. According to aspects of the present disclosure, a user may be presented with item search results that match the user's search intent even in instances in which the user uses uncommon terminology to describe an item type of interest to the user, and/or in which the user includes typographical or grammatical errors in the search query.

In some embodiments, a system described herein may use the text of search queries made by a number of users, language mappings (such as mappings of singular to plural versions of words in one or more languages) and behavioral purchase data to automatically create, cleanse and validate the quality of mappings between search queries. For example, a system as described herein is in some embodiments configured to automatically detect and eliminate poor or inaccurate mappings, such as a mapping between two queries that appear based on a text comparison to represent the same or similar intent, but that are actually associated with significantly different concepts or items in the view of users in a given region or location. For example, mapping two search queries that have singular versus plural versions of the same words may be accurate in most instances as representing the same search intent (such as mapping the query "kid toy" to the query "kids toys"), but inaccurate in other instances as representing significantly different search intent (such as a query of "falcon glove" referring to a bird handling glove, and "falcons gloves" referring to football gloves associated with a team named the Falcons).

Existing systems and methods for generating query mappings typically have a difficult tradeoff between recall and precision. For example, in order to keep precision high, one approach is to set a minimum number of times that a given query must be submitted by different users before the given query will be included in a mapping. These types of data cutoffs and other thresholds are often used to increase relevance. In such embodiments, increasing the number of users or queries that are processed by the system results in significant increases in precision and recall. Existing machine learning approaches to generating query mappings typically target improving either precision or recall, while aspects of the present disclosure enable improvements in both precision and recall.

The query mapping and search results generation approaches described herein provide a number of technical benefits and improvements relative to existing systems, including reduced memory requirements, increased data processing capabilities, and improved precision and recall. For example, with respect to memory requirements, existing collaborative filtering systems often require the mapping of individual queries to item results to be stored in memory. By reducing the number of queries for which a unique list of mapped items is stored, a system employing aspects of the present disclosure requires less memory and runs faster. With respect to data processing ability, existing systems are often limited in terms of the amount of time (such as the number of days of submitted search queries and associated user behavior) that the system can process due to memory constraints. The collapsing or combining of multiple related search queries to have the same search results as one another, as described herein, enables a system to process more data (such as over a longer time period) than would be possible without the mappings.

As one result of combining related search queries as described herein, user behavior when searching for an item is more accurately represented, and is more likely to contribute to improved search results (such as compared to an instance in which the specific search query is submitted less than a threshold amount of times, but meets the threshold when combined with related queries). Additionally, according to aspects of the present disclosure, the quality of search results for infrequently submitted queries may be improved by benefitting from the signal (such as user behavior data) associated with a more popular form of the query.

FIG. 1 is a pictorial diagram depicting an illustrative user interface 110 that presents item search results responsive to a user-submitted search request, where the resulting items were determined to be associated with a revised query 106 that was previously mapped to the user's submitted search query 102. As shown, the user interface 110 is displayed via a browser operating upon a client computing device utilized by a user. In other embodiments, a similar user interface may be presented within an application other than a browser.

As illustrated, the user who is viewing and interacting with the user interface 110 may have typed the text "boypjs" into search field 102 and selected the "search" user interface element or button. The user's computing device may then have sent a search request over a network, such as the Internet, for search results associated with the search query "boypjs" as entered by the user. As will be further discussed below, a retail server or system may then be configured to determine that the user-submitted search query "boypjs" should be altered to a preferred alternate form of "boys pajamas." As will be further discussed below, the search query "boys pajamas" 106 may have been determined by the retail system and/or an associated query mapping service to represent an equivalent search intent as "boypjs," but the "boys pajamas" query may be associated with better search results. For example, the "boys pajamas" query may be more popular or more frequently searched by users than the query "boypjs," which may in turn mean that a search component of the retail server has more prior users' searching, browsing and purchase data to draw from with respect to the "boys pajamas" query when identifying items likely to be of interest to the searching user.

In the illustrated example of FIG. 1, the retail server may have generated search results for the alternate query form of "boys pajamas" 106 rather than the user's query of "boyspjs" entered by the user into search field 102. The resulting items displayed to the user include item 120 ("ABZ 2-Piece Pajamas") and item 122 ("Simple Boys' PJ Set"). The user interface 110 additionally includes department or item category listings 112 related to the alternate query "boys pajamas" 106. The user may select the displayed information for either of the items 120 or 122 to view more information regarding the selected item or initiate an order process for the selected item. If the user would instead like to search for his previously entered query ("boypjs"), he may select option 108. In some instances, selection of option 108 may result in search results that are not particularly relevant to the user's search intent (assuming that the user intended to search for boys' pajamas, which he abbreviated as boy PJs without a space), or may not lead to any search results.

Figure 2:
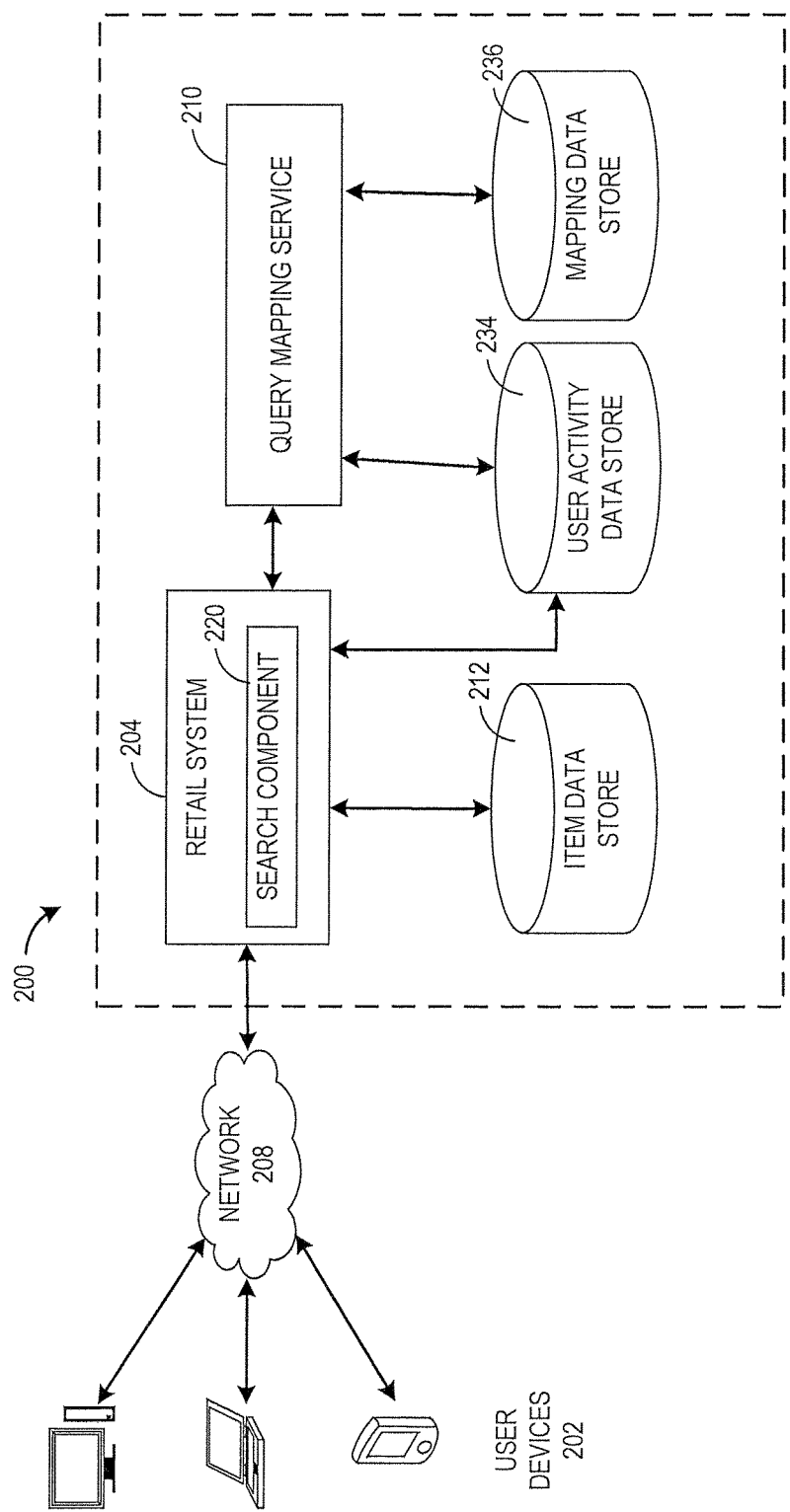
FIG. 2 is a block diagram depicting an illustrative operating environment for generating search query mappings, and for responding to search requests based in part on use of the generated search query mappings.

FIG. 2 is a block diagram depicting an illustrative operating environment for generating search query mappings, and for responding to search requests based in part on use of the generated search query mappings. The illustrative operating environment shown in FIG. 2 includes an electronic catalog system 200 that enables users to browse and search for items (such as items listed in an electronic catalog for purchase). The catalog system 200 may include a query mapping service 210, as well as an associated mapping data store 236, which may be used to implement various aspects of the present disclosure, such as generating, validating and storing mappings or associations between search queries. The catalog system 200 may also include one or more retail servers 204 that facilitate electronic browsing and purchasing of items using various user devices, such as user computing devices 202 (which may alternatively be referred to herein as client computing devices). User computing devices 202 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and/or the like.

The retail server or system 204 may include a search component 220 that generates search results for a user-submitted query to search items in the item data store 212, where the search results may be based on a revised or mapped query that the query mapping service returns to the search component based on the user's entered search query. In other embodiments than that illustrated, the search component 220 and query mapping service 210 may be implemented by the same system or service as each other. For example, a search service may include the search component 220 as a component thereof, and the search service may be configured to search any of a variety of item data stores or repositories in or outside of the retail context (such that no retail system is required in some such embodiments).

Retail system 204 may be connected to and/or in communication with an item data store 212 that stores item information regarding a number of items, such as items listed in an electronic catalog as available for browsing, searching and/or purchasing via the retail system 204. Item data stored in item data store 212 may include any information related to each item. For example, item data may include, but is not limited to, price, availability, title, item identifier, item images, item description, item attributes, item text, item reviews, etc. The item data store 212 may additionally store digital content items (e.g., audiobooks, electronic books, music, movies, multimedia works, etc.). The retail system 204 may also be connected to or in communication with a user activity data store 234, which may store user behavior or activity data associated with users of retail system 204. The stored user behavior data may include individual users' search history, purchase history, browsing history, item reviews and ratings, location information, and/or other information.

In some embodiments, each of the item data store 212, user activity data store 234 and/or mapping data store 236 may be local to retail system 204, may be remote from both the query mapping service 210 and retail system 204, and/or may be a network-based service itself. The illustrated data stores may be embodied in hard disk drives, solid state memories, any other type of non-transitory computer-readable storage medium, and/or a file, a database, a relational database, in-memory cache, and/or stored in any such non-transitory computer-readable medium accessible to the retail system 204 and/or query mapping service 210. The data stores may also be distributed or partitioned across multiple local and/or storage devices, or combined into a single storage device, without departing from the spirit and scope of the present disclosure.

In the environment shown in FIG. 2, a user of the catalog system 200 may utilize a user computing device 202 to communicate with the retail system 204 via a communication network 208, such as the Internet or other communications link. The network 208 may be any wired network, wireless network or combination thereof. In addition, the network 208 may be a personal area network, local area network, wide area network, cable network, satellite network, cellular telephone network, etc. or combination thereof. For example, the network 208 may be a publicly accessible network of linked networks, possibly operated by various distinct parties, such as the Internet. In some embodiments, the network 208 may be a private or semi-private network, such as a corporate or university intranet. The network 208 may include one or more wireless networks, such as a Global System for Mobile Communications (GSM) network, a Code Division Multiple Access (CDMA) network, a Long Term Evolution (LTE) network, or some other type of wireless network. The network 208 may use protocols and components for communicating via the Internet or any of the other aforementioned types of networks.

The catalog system 200 is depicted in FIG. 2 as operating in a distributed computing environment including several computer systems that are interconnected using one or more computer networks. The catalog system 200 could also operate within a computing environment having a fewer or greater number of devices than are illustrated in FIG. 2. Thus, the depiction of catalog system 200 in FIG. 2 should be taken as illustrative and not limiting to the present disclosure. For example, the catalog system 200 could implement various Web services components and/or peer-to-peer network configurations to implement at least a portion of the processes described herein.

In brief, the retail server or system 204 is generally responsible for providing front-end communication with various user devices, such as a user computing device 202, via network 208. The front-end communication provided by the retail system 204 may include generating text and/or graphics, possibly organized as a user interface using hypertext transfer or other protocols in response to information inquiries received from the various user devices. The retail system 204 may obtain information on available items from one or more data stores, such as item data store 212, as is done in conventional electronic commerce systems. In certain embodiments, the retail system 204 may also access item data from other data sources, either internal or external to catalog system 200. In some embodiments other than that illustrated in FIG. 2, the retail system 204 may include or implement a query mapping service, as described herein, such that a separate query mapping service 210 may not be present in certain embodiments.

It will be appreciated that the search functionality and query mapping features described herein may be implemented in a number of different environments than the one illustrated in FIG. 2. For example, individual components or functionality of the retail system 204 and/or query mapping service 210 could be included within a variety of servers, network-accessible services or other systems that provide functionality potentially unrelated to a retail environment (such as with respect to items other than products). In other embodiments, the query mapping service may implement search functionality, generate user interfaces, and locally store item data, such that the retail system 204 is not needed in some embodiments other than that illustrated in FIG. 2.

The present disclosure provides certain examples of search queries and associated items. These are intended to illustrate and not limit the scope of the disclosed search and query mapping techniques. Although examples in the present disclosure focus on the context of digital shopping via an electronic catalog, the disclosed systems and methods can be used to customize browsing experiences outside of the context of an electronic catalog. For example, the disclosed techniques may be useful for identifying news articles, educational resources, web pages, videos, and/or other digital content or items that are likely to align with a network browsing intent of a particular user as reflected in a search query.

The task of navigating a large electronic catalog of items (such as a catalog with thousands of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

Searching techniques and user interfaces of the type disclosed herein significantly reduce this problem, allowing users to locate items of interest with fewer steps. For example, in some embodiments described herein, when a user is presented with item search results, each item listing in the search results interface includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages in order to locate an item of interest via the browse tree or via multiple searches that may be needed to locate an item of interest (such as a user submitting multiple search queries before seeing results of interest to the user). This can be particularly true for computing devices with small screens, where fewer items can be displayed to the user at a time and thus navigation of larger volumes of items is more difficult.

Figure 3:
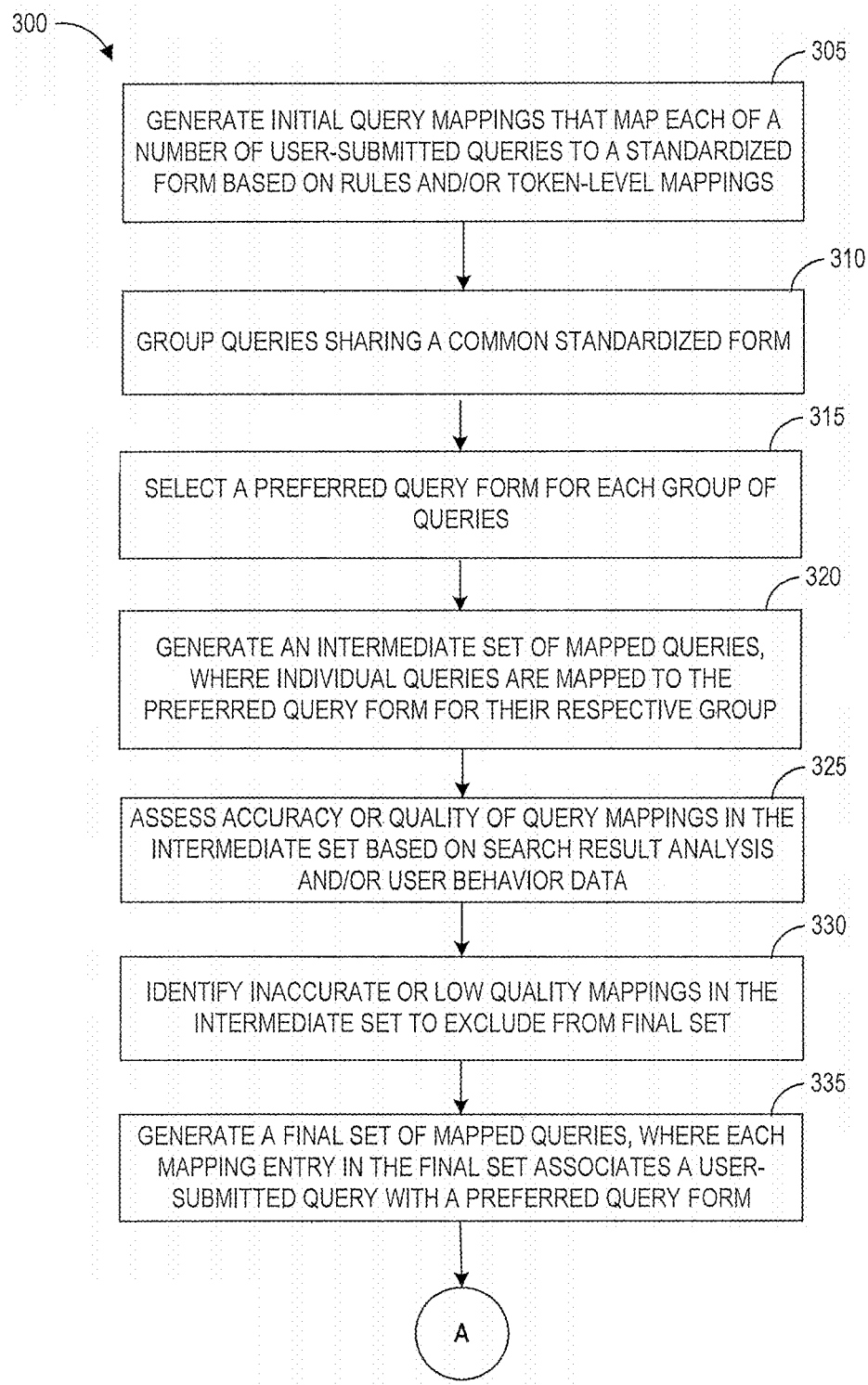
FIG. 3 is a flow diagram depicting an example method of generating and validating a set of mapped search queries, according to some embodiments.

FIG. 3 is a flow diagram depicting an example method 300 of generating and validating a set of mapped search queries, according to some embodiments. The illustrative method 300 may be performed by the query mapping service 210. As will be further described below, method 300 is one example of a method that generally includes generating initial query mappings that map each of a number of user-submitted queries to a popular or other preferred query, then cleansing and validating those mappings to arrive at a final set of mapped queries to be used for selected a preferred form for future user-submitted queries. In some embodiments, the method 300 may be performed on a batch basis, such as based on a schedule (such as daily or weekly)

or in response to a triggering event (such as the availability of new user activity or search query data to be considered in updating the mappings).

Initial input data considered in method 300 may include, for example, a list of search query strings submitted by users to the retail system 204 over a certain time period, such as the past week, past month or past sixty days. In some embodiments, pre-processing of this query history data prior to method 300 may include, for example, determining a total count or frequency of each unique search query over the given time period (such as by storing an indication that the search query "kids toys" was searched by users 250 times in the past month, and the search query "kid toys" was searched by users 210 times in the past month). An example excerpt of a table or other data structure storing this aggregated query and frequency information for a given time period is visually depicted in query data 502 of FIG. 5. For example, the first entry or row of the query data 502 indicates that the search query "a cowboy tale" was entered by users a total of eleven times over the given time period (such as a recent sixty day period).

The illustrative method 300 begins at block 305, where the query mapping service generates initial query mappings that map each of a number of user-submitted queries to a standardized form (which may alternatively be referred to herein as a normalized form), such as based on a set of rules and/or previously stored token-level mappings. For example, users may enter search queries in a variety of ways that may depend on factors such as their language familiarity (e.g., entering a search query in English when English is not their primary language), the time that they have, typing ability (e.g., inaccurate typing on a small touchscreen input device), etc. In many instances, a significant number of query variations may in fact represent the same search intent or query meaning on behalf of the users entering the queries. For example, a first user entering the search query "girls pjs and bathrobes" may have an identical search intent to a second user entering the different search query "girl pyjama and bath robe," such that each of these users would likely be satisfied with receiving identical item search results in response to these two queries. More broadly, each of twenty-four different search queries that may be formed using different combinations of "{girls/girls} {pajamas/pyjama/pj/pjs} and {bathrobes/bathrobe/bath robe}" may represent the same high-level concept or search intent that could be described as a user requesting to see items that include girls' pajamas and bathrobes.

In some embodiments, to address the above equivalence of user intent across potentially dozens or more search query variations, the query mapping service may generate the initial query mappings at block 305 by applying a number of one-to-one mappings of individual tokens, words, or combinations of words that are included within a given query in order to normalize or standardize different word or term forms. For example, word-level, term-level or token-level rules or mappings may be stored to normalize across a number of variations such as one or more of: (a) singular, plural and possessive forms (e.g., "girl," "girls," and "girl's"); (b) spelling variations, including typographical errors or misspellings (e.g., "pajamas," "pyjamas," and "pahamas"); (c) shorter forms of words or abbreviations ("pj" instead of "pajama"); (d) differences in compound word forms that may appear in trigram, bigram and/or unigram form (e.g., "bathrobe" versus "bath robe", or "1 lb" versus "1 lb"); and/or other edge cases or particular rules, such as using a "+" instead of a space (e.g., "mens+shoes" versus "mens shoes"). These standard or normalized forms for each of the above or other situations may be determined by a rule and/or by a lookup in a dictionary file or mapping file, for example. In some embodiments, the mapping or rules may be applied at each of the unigram level, bigram level, trigram level, and/or in other manners.

As an example in one embodiment, the initial query mapping or standardized form for an individual query may be generated by breaking the query string into tokens separated by delimiters (such as spaces within the query), identifying a token-level mapping for each token, then concatenating the resulting token-level mappings together (such as by adding spaces back between the token-level mappings). For example, a token-level mapping file or lookup table may indicate that each of the tokens "pj," "pjs," "pajamas," "pajama," "pahamas," and/or others should map to a standardized token form of "pajama." If the token-level mappings file or other mapping data further indicates that the token "girl" should map to "girls," then the result of determining the standardized form of the user-submitted query "girl pjs" at block 305 may be "girls pajamas." The previously stored token-level mappings entry for a given word may include, for example, a list of known misspellings, synonyms, abbreviations, singular/plural forms, possessive forms, nicknames, slang terms, etc.

The results of implementing block 305 may be an additional entry or association being stored for each user-submitted query that indicates that user-submitted query's standardized form. For example, a previously stored table or data structure that previously included columns for query and frequency (as in query data 502 of FIG. 5) may have a column or field added that includes the standardized form of each individual query. This standardized form information will be used to group related queries that share the same standardized form, as will be discussed below. Because the standardized form is an intermediate form used within the method 300, it is not necessary that the standardized form of a query be an actual query that itself has ever been entered by a user or that would be recognizable to a person as a properly worded query.

Next, at block 310, the query mapping service groups queries sharing a common standardized form. For example, a table, list or other data structure storing rows or entries for each individual pairing of user-submitted query to its standardized form may be sorted by the standardized form value of each entry such that different user-submitted queries that have the same standardized form as one another are grouped together as adjacent entries or rows. An excerpt of a sample data structure after block 310 is performed is visually illustrated in standardized mappings 504 of FIG. 5. As shown in standardized mappings 504, the first four queries in the sorted table (sorted by the values in the "standardized form" column) all share a common standardized form ("a cow boy tale"). As an example, there may be a book titled "A Cowboy's Tale" that users were likely searching for when entering each of the four different user-submitted queries "a cowboy tale," "a cowboys tale," "a cowboy?s tale," and "a cowboy's tale."

At block 315, the query mapping service selects a preferred query form for each group of queries, where a group may refer to a cluster or set of user-submitted queries that share the same standardized form as each other. In some embodiments, the query mapping service may be configured to select the most popular query in each group (e.g., the user-submitted query, within the given cluster or group of user-submitted queries, that was submitted the highest number of times by users in the time period being analyzed) as the preferred query form for the given group.

In some embodiments, if two user-submitted queries have the same search count or frequency as each other (e.g., two search queries that share the same standardized form were each submitted ten times by users), the query mapping service may be configured to break the tie by selecting the longer user-submitted query as the preferred form among those two variations (e.g., the query "kids toys" may be selected as the preferred form over the query "kidstoys"). In other embodiments, different criteria, tie-breaking rules, and/or transformations may be applied in selecting the standardized form for a group or cluster of user-submitted queries that share a common standardized form. For example, preference may be given to user-submitted queries containing spaces, meeting grammatical rules, and/or based on their similarity distance from other queries in the cluster.

At block 320, the query mapping service generates an intermediate set of mapped queries, where individual queries are mapped to the preferred query form for their respective group. For example, as illustrated in intermediate set 506 of FIG. 5, a number of queries have each been assigned the same preferred query form of "a cowboys tale." In the illustrated example of FIG. 5, "a cowboys tale" may have been selected as the preferred query for this query cluster or grouping because the user-submitted query "a cowboys tale" had the highest search frequency among the user-submitted queries that share the standardized form "a cow boy tale" in standardized mappings 504.

Blocks 305, 310, 315, and 320, as described above, are intended to provide examples of specific manners in which an intermediate set of mapped queries may be generated. However, the intermediate set may be generated in other manners than those described above, and the remaining blocks of method 300 described below may be implemented to improve the quality of the intermediate mappings regardless of whether the intermediate mappings were generated in the manner described above. For example, in other embodiments than those described above, the intermediate set of mapped queries may be generated using machine learning techniques (such as using neural networks, a K-Nearest Neighbors algorithm, and/or others), word embeddings, query embeddings, text similarity techniques, Levenshtein distance between queries and/or tokens, and/or other methods. For example, in some embodiments, the intermediate set of mapped queries may be received by the query mapping service 210 from another system and may then be improved by the query mapping service in the manners described below (such as by removing low quality or inaccurate mappings based on analysis of user behavior data) regardless of how the intermediate set was originally generated by the other system or service.

Once the intermediate set of mapped queries is generated, the method 300 may proceed to the next stage or phase of method 300, focused on verification or validation of the intermediate mappings, beginning at block 325. The verification or validation phase may generally be concerned with confirming that the final mappings do not include mappings between two queries that users would not consider to have the same meaning or search intent as each other (such as "head light" and "headlight," where the first may be likely to be entered by a user searching for a wearable headlamp, and the second may be more likely to be entered by a user searching for a car headlight bulb). At block 325, the query mapping service assesses accuracy or quality of individual query mappings in the intermediate set. In some embodiments, the accuracy or quality may be assessed based at least in part on analysis of search results for the queries and/or user behavior data associated with past submission of the queries, such as using collaborative filtering.

In one embodiment, the query mapping service may determine, for each query, a set of items viewed and/or purchased by users subsequent to the given users' submitting the search query. For user-submitted query and each preferred query form, the query mapping service may generate a query-to-item mapping. Thus, with reference to the first row in the intermediate set 506 of FIG. 5, for example, the query mapping service may generate a listing of the items viewed and/or purchased by users after they submitted the query "a cowboy tale," as well as generating a listing of the items viewed and/or purchased by users after they submitted the corresponding preferred query "a cowboys tale." For each pairing of user-submitted query and preferred query for which item mappings are available, the query mapping service may then identify an extent to which items are in common between the item mappings of the two queries. As an example implementation in one embodiment, this may include removing all items that are in common between both item mappings of the pair, and computing the harmonic mean of the number of remaining items in each mapping. In other words, the number of items present only in the user-submitted query's item mapping may be assigned as x, the number of items present only in the preferred query's item mapping may be assigned as y, and the harmonic mean may be computed as $(2xy/(x+y))$.

It will be appreciated that other approaches of determining relative difference between the item mappings of each query pairing may be used in other embodiments. For example, approaches other than a harmonic mean may be employed in identifying the extent of difference between the items browsed and/or purchased by users after submitting each query of a pairing. In other embodiments, instead of or in addition to mapping the queries to the items viewed and/or purchased by the users after submitting the given query, the query mapping service may generate the item mapping for each query to include the actual item search results when the given query is searched. This approach may indirectly rely on similar user behavior data because, depending on the search algorithms employed in a given system, the item search results may themselves be based on an analysis of user behavior after prior users submitted the search query (e.g., the search results may be based at least partly on prior users' browsing and purchase behavior).

At block 330, the query mapping service identifies one or more inaccurate or low quality mappings in the intermediate set based on the assessment performed at block 325. For example, a first query likely should not be mapped to a second query if users historically view and purchase vastly different items after searching the first query than after searching the second query. Accordingly, in some embodiments, the query mapping service may identify inaccurate or low quality mappings as those pairings of user-submitted query and preferred query (in the intermediate set) for which the harmonic mean (or similar metric) discussed above is larger than a threshold. The threshold may be a configurable value set by an administrator of the system. In some embodiments, the threshold may be set in an adaptive manner, such as by adjusting the threshold while iteratively repeating the assessments and removing inaccurate mappings until the number of inaccurate mappings identified declines to an acceptable level. In some embodiments, mappings identified as potentially inaccurate at block 330 may be flagged for manual review rather than automatically removed from the intermediate set.

In some embodiments, the inaccurate or low quality mappings identified at block 330 may be stored in a data repository or file for later use in identifying potential ambiguities in user-submitted text or spoken utterances. For example, if "head light" and "headlight" are identified as an inaccurate mapping, an indication may be stored that these two phrases have significantly different meanings despite being very similar in appearance and/or sound (such as storing a list of words or phrases determined to have the potential to be ambiguous). Such a list or database may be particularly useful, for example, for subsequent use in identifying instances in which a system should seek further clarification or confirmation from a user before responding to a potentially ambiguous query. As one example, if a voice recognition system or service uses speech-to-text techniques to determine that a spoken query from a user seemed to include a phrase that sounded like "headlight" (such as the spoken query "How long do headlights last?"), the system may determine that it should ask the user for clarification regarding which of the stored options of potentially alternative phrases the system should search (for example, by asking the user "Do you mean a wearable headlamp or a vehicle headlight?").

At block 335, the query mapping service generates a final set of mapped queries that includes a subset of the intermediate set and excludes the inaccurate or low quality mappings, where each mapping entry in the final set associates a user-submitted query with a corresponding preferred query form. For example, the final set may include the intermediate mappings that were not identified as inaccurate or low quality at block 330. An example excerpt of the final mappings in one embodiment are shown in final set 508 of FIG. 5. As shown in final set 508, the mapping of "cowboy" to "cowboys" in the intermediate set 506 may have been removed from the final set 508 because it was determined by the query mapping service to be an inaccurate mapping (for example, identified as a mapping between two queries that do not represent the same search intent or search concept). This may have been due, for example, to user behavior data indicating that users who searched for "cowboy" typically then browsed and/or purchased items like cowboy boots and cowboy hats, while users who searched for "cowboys" typically then browsed and/or purchased items associated with a football team named the Cowboys.

Once the final set of mapped queries has been generated, the final set may be stored, such as in mapping data store 236, for subsequent use in responding to search requests (discussed below with respect to FIG. 4). Additionally, the query mapping service may generate and store a reverse lookup associating each preferred query with a set of one or more user-submitted queries for which it has been selected as the preferred form.

Figure 4:
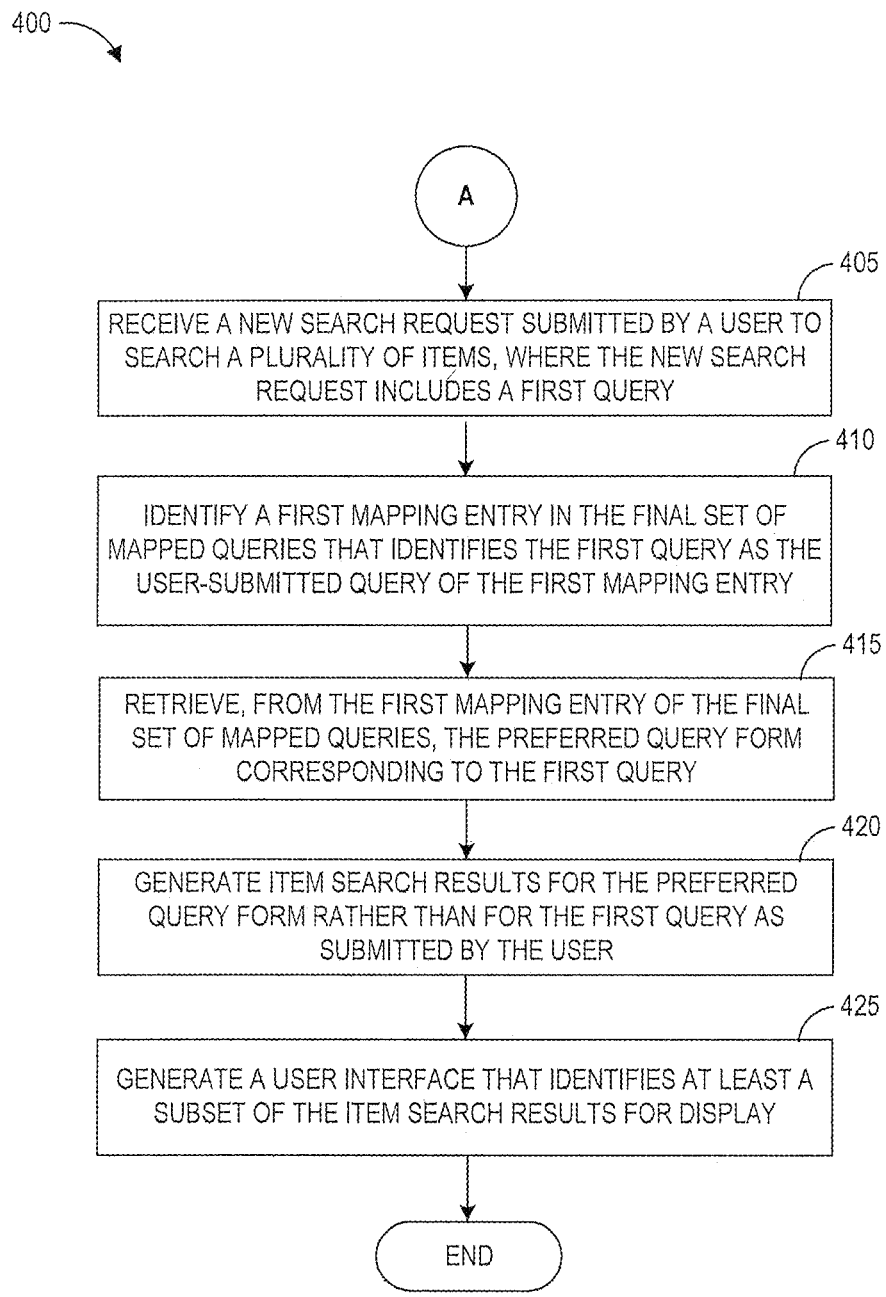
FIG. 4 is a flow diagram depicting an example method of responding to a search request with item results that are determined based in part on a previously stored query mapping, according to some embodiments.

FIG. 4 is a flow diagram depicting an example method 400 of responding to a search request with item results that are determined based in part on a previously stored query mapping, according to some embodiments. The illustrative method 400 may be performed by the retail system 204 and/or the query mapping service 210, depending on the embodiment. The method 400 may occur at any point after the final set of mappings have been stored for use, as described above with respect to FIG. 3.

While FIG. 4 describes an example use of the final set of mappings in the context of generating results in response to a user search query, it will be appreciated that there are a wide variety of other uses for the final set of mappings (as well as for the list of known ambiguities or other entries excluded from the final set of mappings, as discussed above). For example, multiple queries sharing a common preferred form may have various data aggregated among those queries (e.g., aggregating the search count and user behavior data among mapped queries), such that a list of the most popular search terms or queries will more accurately reflect the total times that variations of the same concept were searched. As another example, recommendations to a user, such as an indication of items that other users viewed or purchased after submitting a given search term, may be improved by pooling or aggregating the user viewing and purchase data associated with multiple mapped variations of a given term or query. These advantages are not limited to a search query, but may be equally useful in the other contexts in which a user formulates a question or other request to a system via user-submitted text or voice utterances.

The illustrative method 400 begins at block 405, where the retail system 204 may receive a new search request submitted by a user to search the electronic catalog or other item repository. The new search request includes a first query (such as a search string), as well as potentially other optional search criteria (such as search filters, user identity information, and/or other data). The retail system 204 may be configured to check with the query mapping service to select a preferred query form for the user-entered query prior to generating item search results using the search component 220. Accordingly, at block 410, the retail system 204 may send a request to the query mapping service 210 for a preferred form for the user-entered search query.

The query mapping service 210 may then identify a mapping entry in the final set of mapped queries that identifies the first query (entered by the current user) as the user-submitted query of the given mapping entry. At block 415, the query mapping service 210 may retrieve, from the given mapping entry of the final set of mapped queries, the preferred query form corresponding to the current user's entered query. For example, with reference to the final set of mapped queries 508 of FIG. 5, if the current user entered the search query "a cowboy tale" then the query mapping service may identify "a cowboys tale" as the preferred form of the user-entered query. The query mapping service 210 may then return this preferred form to the retail system in order for the retail system to generate item search results for the preferred query.

At block 420, the retail system 204 may generate item search results for the preferred query form rather than for the first query as submitted by the user. The actual search results may be generated using any of a number of known search methods that are configured to generate matching items for a given input search string. For example, the search results may include items that users who previously searched for the given search query viewed and/or purchased after entering their query. At block 425, the retail system may then generate a user interface that identifies at least a subset of the item search results for display to the user. For example, a page or other user interface may be generated that identifies the top ten items matching the preferred query form, with selectable options to view more information about individual items or to view additional matching items. An illustrative user interface displaying search results is discussed above with respect to FIG. 1.

While FIG. 4 described use of the final query mappings that involves automatically showing search results for a preferred query version rather than the actual user-submitted query, the query mappings may be used in other ways in other embodiments. For example, in one embodiment, the retail system 204 and/or query mapping service 210 may be configured to suggest changes to a user in real time as the user types a search string (prior to the user submitting the search request, such as prior to the user pressing a "search" button or user interface element) based on the mappings, where a user interface enables the user to accept that the suggested query be used as a basis for the search. In another embodiment, the retail system 204 and/or query mapping service 210 may display search results for the user's original entered search query, along with an indication of the preferred query with an option to view those search results (such as a selectable option reading in part "Users also searched for [preferred query]" or "Did you mean [preferred query]?").

Figure 5:
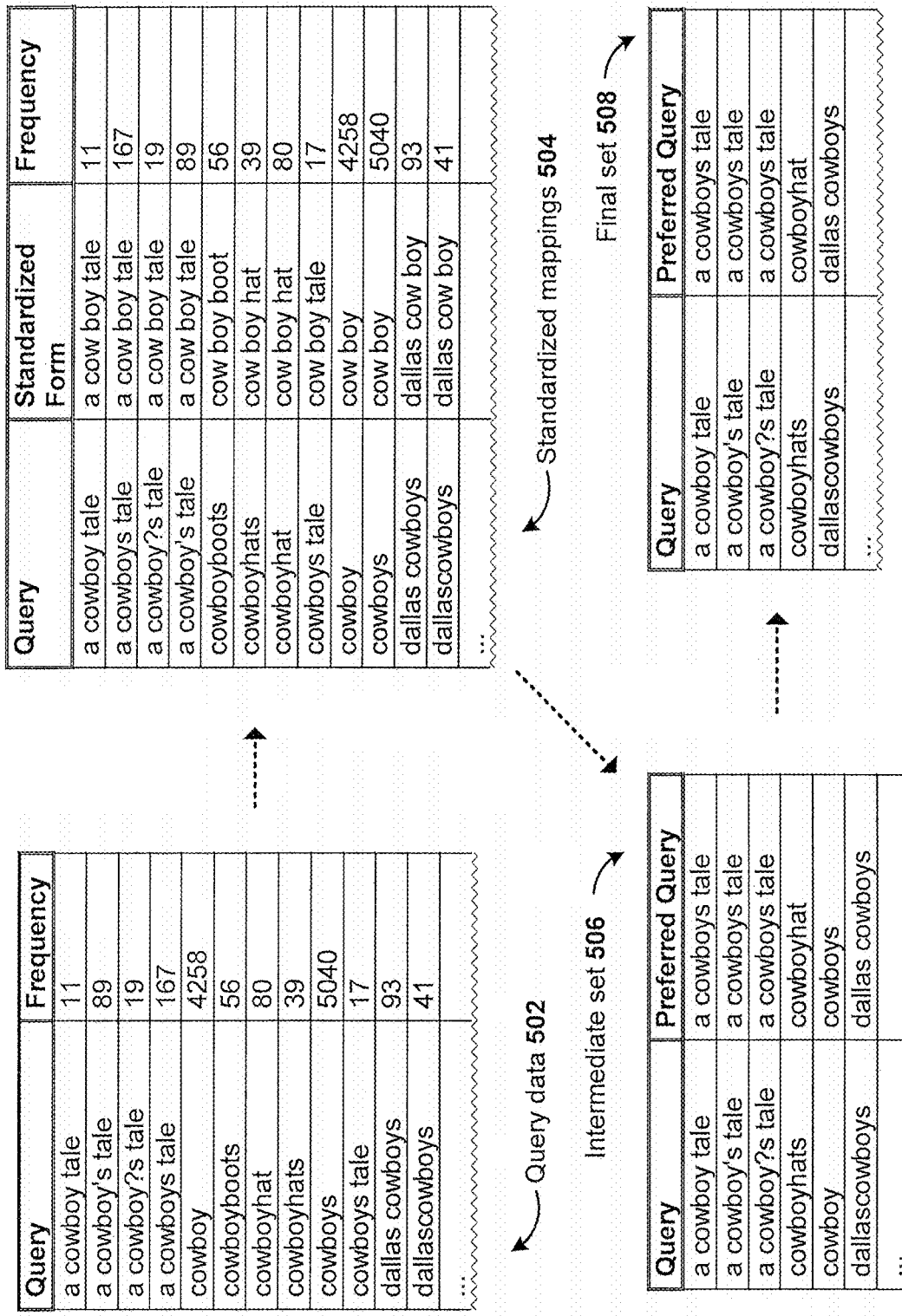
FIG. 5 depicts visual representations of portions of data structures or associations that may be stored at various stages of query mapping generation, according to an example embodiment.

FIG. 5 depicts visual representations of portions of data structures or associations that may be stored at various stages of query mapping generation, according to an example embodiment. The query data 502, standardized mappings 504, intermediate set 506, and final set of query mappings 508 have been discussed above in association with respective blocks of method 300 (described with respect to FIG. 3 above).

Figure 6:
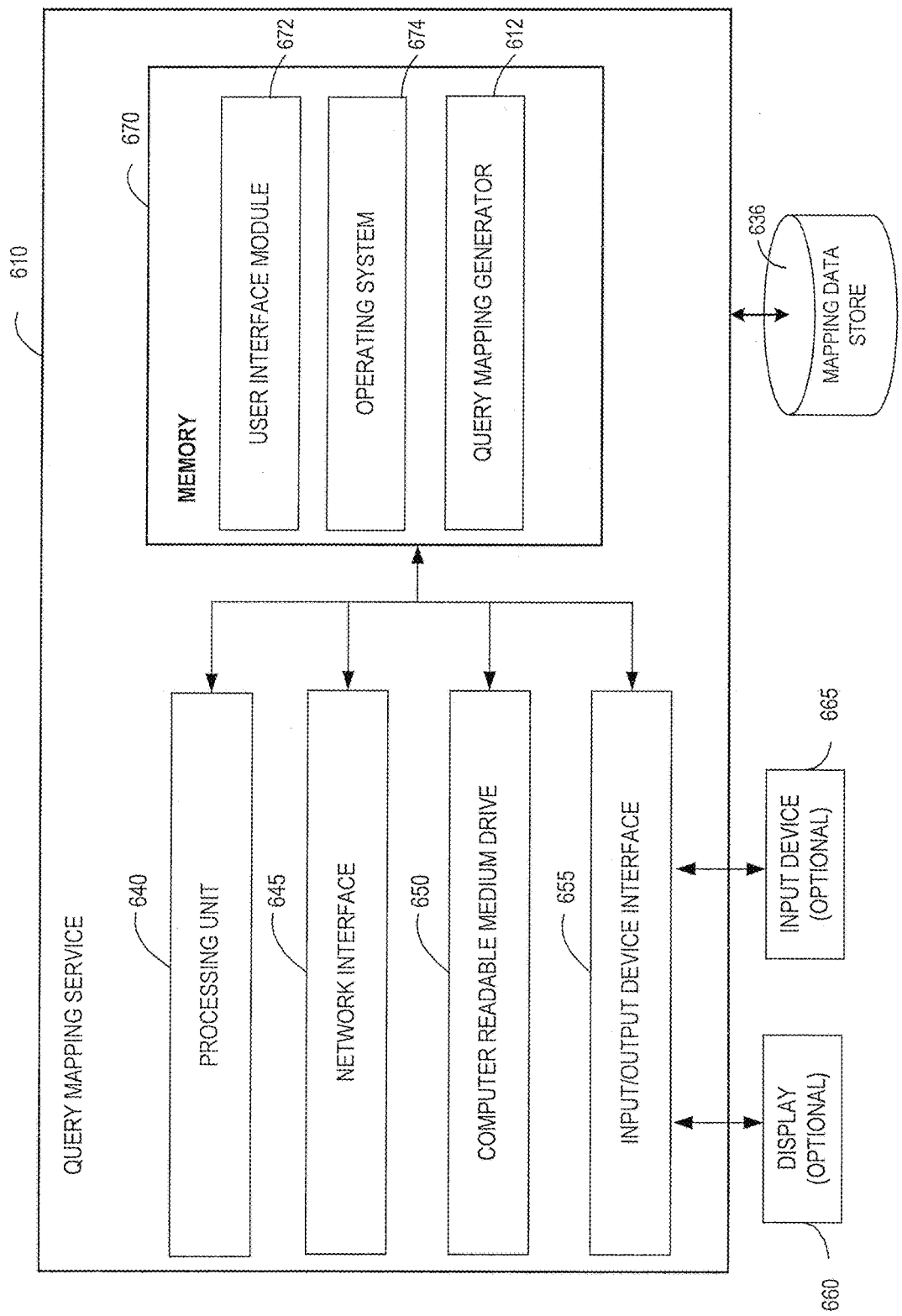
FIG. 6 is a block diagram depicting an illustrative architecture for a computing system that may implement one or more of the features described herein.

FIG. 6 depicts a general architecture of a computing system (referenced as query mapping service 610) configured to implement various aspects of the present disclosure. The general architecture of the query mapping service 610 depicted in FIG. 6 includes an arrangement of computer hardware and software components. The query mapping service 610 may include many more (or fewer) elements than those shown in FIG. 6. It is not necessary, however, that all of these generally conventional elements be shown in order to provide an enabling disclosure. As illustrated, the query mapping service 610 includes a processing unit 640, a network interface 645, a computer readable medium drive 650, an input/output device interface 655, an optional display 660, and an optional input device 665, all of which may communicate with one another by way of a communication bus. The network interface 645 may provide connectivity to one or more networks or computing systems. The processing unit 640 may thus receive information and instructions from other computing systems or services via a network. The processing unit 640 may also communicate to and from memory 670 and further provide output information for an optional display 660 via the input/output device interface 655. The input/output device interface 655 may also accept input from the optional input device 665, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 640 executes in order to implement one or more embodiments. The memory 670 generally includes RAM, ROM and/or other persistent, auxiliary or non-transitory computer-readable media. The memory 670 may store an operating system 674 that provides computer program instructions for use by the processing unit 640 in the general administration and operation of the query mapping service 610. The memory 670 may further include computer program instructions and other information for implementing aspects of the present disclosure. For example, in one embodiment, the memory 670 includes a user interface module 672 that generates user interfaces (and/or instructions therefor) for display upon a computing device, e.g., via a navigation interface such as a browser or application installed on the computing device. In addition, memory 670 may include or communicate with a mapping data store 636 and/or one or more other data stores, as discussed above.

Query mapping generator 612 may be configured to generate query mappings and respond to requests for a replacement query for a given user-submitted query, such as by implementing the methods described above with respect to FIGS. 3 and/or 4, in some embodiments. While query mapping generator 612 is shown in FIG. 6 as part of the query mapping service 610, in other embodiments, all or a portion of the query mapping generator 612 may be implemented by the retail system 204 and/or another computing device. In some embodiments, the retail system 204 may include several components that operate similarly to the components illustrated as part of the query mapping service 610, including a user interface module, query mapping generator, processing unit, computer readable medium drive, etc. In some such embodiments, the query mapping service 610 may not be needed because its functionality may be implemented entirely by a retail system or other system or server that also provides front-end communication with user devices for browsing and searching items.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a non-transitory data store that stores search query information associated with a plurality of search requests submitted by a plurality of users;
   at least one computing device configured with computer-executable instructions that, when executed, cause the at least one computing device to:
   generate initial query mappings that associate each of a number of user-submitted queries in the search query information to a corresponding normalized form, wherein a normalized form for an individual query is generated based at least in part by substituting one or more tokens within the individual query with a corresponding replacement token;
   identify groups of user-submitted queries within the initial query mappings such that user-submitted queries within an individual group have a same normalized form as each other user-submitted query within the individual group;
   select a preferred query form for each of at least some of the groups of user-submitted queries, wherein a first preferred query for a first group is selected to be one of a plurality of user-submitted queries in the first group, wherein the first preferred query is selected based at least in part on a frequency of user submission of the first preferred query relative to frequencies of user submission of other queries in the first group;
   generate an intermediate set of mapped queries, wherein individual queries in the intermediate set are mapped to a preferred query form selected for a respective group of queries;
   identify an inaccurate mapping in the intermediate set, wherein the inaccurate mapping is identified based at least in part on analysis of user behavior data associated with (a) a first set of prior search requests that included a first query in the inaccurate mapping and (c) a second set of prior search requests that included a second query in the inaccurate mapping;
   generate a final set of mapped queries that includes a subset of the intermediate set and excludes at least the inaccurate mapping, wherein the final set includes a plurality of mappings that each associate a particular user-submitted query with a corresponding preferred query form; and
   in response to a search request that includes a first user-submitted query:
   identify a first preferred query form for the first user-submitted query based on the final set of mapped queries; and
   generate search results responsive to the search request, wherein the search results include a plurality of items associated with the first preferred query form.

2. The system of claim 1, wherein the search request is received based at least in part on one or more user selections made within a user interface, wherein the first user-submitted query is received as text entered within a field of the user interface, and wherein the computer-executable instructions further cause the at least one computing device to:
   generate an updated user interface that includes the search results, wherein the updated user interface includes (a) identification of one or more of the plurality of items associated with the first preferred query form, and (b) identification of the first preferred query form that was used instead of the first user-submitted query in generating the search results.

3. The system of claim 1, wherein to identify the inaccurate mapping in the intermediate set, the computer-executable instructions further cause the at least one computing device to:
   determine a first set of items viewed or purchased by users that submitted the first set of prior search requests that included the first query;
   determine a second set of items viewed or purchased by users that submitted the second set of prior search requests that included the second query; and
   identify an extent to which the first set of items is similar to the second set of items.

4. A computer-implemented method comprising:
   obtaining search query information associated with search requests submitted by users;
   generating initial query mappings that associate each of a number of user-submitted queries in the search query information to a corresponding normalized form;
   identifying groups of user-submitted queries within the initial query mappings such that user-submitted queries within an individual group have a same normalized form as each other user-submitted query within the individual group;
   selecting a preferred query form for each of at least some of the groups of user-submitted queries, wherein a first preferred query for a first group is selected to be one of a plurality of user-submitted queries in the first group;
   generating an intermediate set of mapped queries, wherein individual queries in the intermediate set are mapped to a preferred query form selected for a respective group of queries;

identifying an inaccurate mapping in the intermediate set, wherein the inaccurate mapping is identified based at least in part on analysis of user behavior data associated with (a) a first set of prior search requests that included a first query in the inaccurate mapping and (c) a second set of prior search requests that included a second query in the inaccurate mapping; and generating a final set of mapped queries that includes a subset of the intermediate set and excludes at least the inaccurate mapping, wherein the final set includes a plurality of mappings that each associate a particular user-submitted query with a corresponding preferred query form.

5. The computer-implemented method of claim 4 further comprising:

receiving a search request that includes a first user-submitted query;

identifying a first preferred query form for the first user-submitted query based on the final set of mapped queries; and generating search results responsive to the search request, wherein the search results include a plurality of items associated with the first preferred query form.

6. The computer-implemented method of claim 4, further comprising:

receiving indication of a first user-submitted query entered into a field of a user interface in association with a search request;

identifying a first preferred query form for the first user-submitted query based on the final set of mapped queries; and causing display, within the user interface, of the first preferred query form, wherein the user interface enables the user to select that the first preferred query form be used instead of the first user-submitted query when generating search results for the search request.

7. The computer-implemented method of claim 4, further comprising generating a normalized form for an individual query based at least in part by substituting one or more tokens within the individual query with a corresponding replacement token.

8. The computer-implemented method of claim 7, wherein a replacement token for a first token in the individual query is determined based at least in part on previously stored mapping information that maps each of a plurality of tokens to a preferred token form.

9. The computer-implemented method of claim 4, wherein the first preferred query is selected based at least in part on a frequency of user submission of the first preferred query relative to frequencies of user submission of other queries in the first group.

10. The computer-implemented method of claim 9, wherein the first preferred query is determined to have been submitted by users more times than the other queries in the first group over a time period.

11. The computer-implemented method of claim 4, wherein identifying the inaccurate mapping in the intermediate set comprises:

determining a first set of items viewed or purchased by users that submitted search requests that included a first query in the inaccurate mapping;

determining a second set of items viewed or purchased by users that submitted search requests that included a second query in the inaccurate mapping;

calculating a numeric representation of an extent to which the first set of items differs from the second set of items; and determining that the numeric representation exceeds a threshold.

12. The computer-implemented method of claim 11, wherein the numeric representation is calculated as a harmonic mean of (a) a first number of items appearing in the first set of items but not appearing in the second set of items, and (b) a second number of items appearing in the second set of items but not appearing in the first set of items.

13. The computer-implemented method of claim 4, further comprising generating a first normalized form for a first user-submitted query, wherein generating the first normalized form comprises:

separating the first user-submitted query into a plurality of tokens based on identification of text delimiters within the first user-submitted query;

identifying a token-level mapping for each of the plurality of tokens; and concatenating the token-level mappings to generate the first normalized form.

14. The computer-implemented method of claim 13, wherein the token-level mappings are identified based at least in part on stored information indicating, for each of a plurality of words, at least one of: a known misspelling, a synonym, an abbreviation, a plural form, a singular form, a possessive form, a bigram form of two unigrams, or a nickname.

15. A system comprising:

a non-transitory data store that stores search query information associated with a plurality of search requests submitted by a plurality of users;

at least one computing device configured with computer-executable instructions that, when executed, cause the at least one computing device to:

obtain an initial set of mapped queries, wherein an individual mapping in the initial set comprises a query mapped to a preferred query form for the query;

identify an inaccurate mapping in the initial set, wherein the inaccurate mapping is identified based at least in part on analysis of user behavior data associated with (a) a first set of prior search requests that included a first query in the inaccurate mapping and (c) a second set of prior search requests that included a second query in the inaccurate mapping; and generate a final set of mapped queries that includes a subset of the initial set and excludes at least the inaccurate mapping, wherein the final set includes a plurality of mappings that each associate a particular query with a corresponding preferred query form.

16. The system of claim 15, wherein the inaccurate mapping is identified based at least in part on a determination that the user behavior data indicates that users view different items after submitting the first query than after submitting the second query.

17. The system of claim 15, wherein the computer-executable instructions further cause the at least one computing device to:

receive a search request that includes a first user-submitted query;

identify a first preferred query form for the first user-submitted query based on the final set of mapped queries; and generate search results responsive to the search request, wherein the search results include a plurality of items associated with the first preferred query form.

18. The system of claim 15, wherein the computer-executable instructions further cause the at least one computing device to:
- subsequent to identifying the inaccurate mapping, receive a user request that includes the first query within user-submitted text or a spoken voice utterance;
- determine that the first query is included in the inaccurate mapping; and
- respond to the user request with a visual or spoken request for clarification regarding whether an intent of the user request relates to the first query or the second query in the inaccurate mapping.

19. The system of claim 15, wherein the initial set of mapped queries indicates associations between a plurality of queries that contain different forms of a same word, wherein the different forms of the same word comprise two or more of: a singular, a plural, a possessive, or an abbreviation.

20. The system of claim 15, wherein the user behavior data considered in identifying the inaccurate mapping comprises item purchase data indicating (a) a first set of items purchased by users that submitted the first set of prior search requests and (b) a second set of items purchased by users that submitted the second set of prior search requests.

* * * * *